United States Patent [19]

Nakaso et al.

[11] Patent Number: 5,079,952
[45] Date of Patent: Jan. 14, 1992

[54] ULTRASONIC TRANSDUCER ASSEMBLY AND ULTRASONIC ACOUSTIC MICROSCOPE

[75] Inventors: Noritaka Nakaso; Yusuke Tsukahara; Masao Saito; Katsumi Ohira, all of Tokyo, Japan

[73] Assignee: Poppan Printing Co., Tokyo, Japan

[21] Appl. No.: 495,961

[22] Filed: Mar. 20, 1990

[30] Foreign Application Priority Data

Mar. 25, 1989 [JP] Japan .................. 1-172959
Mar. 25, 1989 [JP] Japan .................. 1-172960

[51] Int. Cl.$^5$ ...................... G01N 29/06; G01N 29/24
[52] U.S. Cl. ........................ 73/624; 73/633; 73/641
[58] Field of Search .............. 73/617, 620, 624, 625, 73/628, 632, 633, 641, 642

[56] References Cited

U.S. PATENT DOCUMENTS

| | | | |
|---|---|---|---|
| 3,380,293 | 4/1968 | Murphy | 73/624 |
| 3,712,119 | 1/1973 | Cross et al. | 73/624 |
| 3,924,454 | 12/1975 | McElroy et al. | 73/628 |
| 4,080,839 | 3/1978 | Shraiber et al. | 73/617 |

Primary Examiner—Hezron E. Williams
Assistant Examiner—Rose M. Finley
Attorney, Agent, or Firm—Armstrong, Nikaido, Marmelstein, Kubovcik & Murray

[57] ABSTRACT

Various ultrasonic transducer assemblies are disclosed in which each assembly includes a pair of ultrasonic transducers for emitting or receiving an ultrasonic wave, respectively, and wherein the ultrasonic transducers include a concave shaped ultrasonic transducer and a flat shaped ultrasonic transducer. The ultrasonic transducer assemblies realize excellent magnitude of accuracy, resolving power, versatility and simplicity in handling. In addition, various ultrasonic acoustic microscopes are disclosed incorporating the aforementioned ultrasonic transducer assemblies and realizing the same results thereof.

21 Claims, 12 Drawing Sheets

SIGNAL INTENSITY

DISTANCE BETWEEN THE CONCAVE & AN SPECIMEN

ULTRASONIC TRANSDUCER ASSEMBLY AND ULTRASONIC ACOUSTIC MICROSCOPE

FIELD OF THE INVENTION

This invention relates to improvements applicable to an ultrasonic transducer assembly and to an ultrasonic acoustic microscope. More specifically, this invention relates to a plurality of improvements described below. The first improvement is applicable to an ultrasonic transducer assembly comprising an ultrasonic generator having an ultrasonic wave emitting surface which is inclined with respect to the surface of a specimen and an ultrasonic receiver having an ultrasonic wave receiving surface which is inclined with respect to the surface of the same specimen, for the purpose of increasing the accuracy thereof, to improve the resolving power thereof and to give versatility for selection or adjustment of the inclination of each ultrasonic generator and each ultrasonic receiver with respect to a specimen and to simplify the procedure for employment thereof. The second improvement is applicable to an ultrasonic acoustic microscope having an ultrasonic generator of which the surface is inclined with respect to the surface of a specimen and an ultrasonic receiver of which the surface is inclined with respect to the surface of the same specimen for the purpose of increasing the accuracy thereof, to improve the resolving power thereof, and to give versatility for selection or adjustment of the inclination of each ultrasonic generator and each ultrasonic receiver with respect to a specimen and to simplify the procedure for employment thereof.

BACKGROUND OF THE INVENTION

An ultrasonic transducer is defined as a device for generating or receiving an ultrasonic wave, which usually is a piezoelectric crystal element which is a plate of a piezoelectric crystal or a piezoelectric body, e.g. a zinc oxide plate sandwiched by a pair of electrodes.

The reflection characteristics of an ultrasonic wave depend on various physical characteristics of a specimen on or inside of which the ultrasonic wave is reflected. In addition to the elastic modulus, Young's modulus, etc. of the material of the specimen, the reflection characteristics of the ultrasonic wave depend on the layer structure of the specimen. Whenever an ultrasonic wave collides with the surface of a substrate having no particular layer structure, in an inclined direction specific to the material of the substrate, an elastic surface wave which is defined as a progressive wave traveling along the surface of and/or inside the specimen is generated, independently of the frequency of the ultrasonic wave. On the other hand, when an ultrasonic wave collides with the surface of a specimen having a layer structure, no elastic surface wave is generated, unless a specific condition which is a combination of the frequency of the ultrasonic wave and the incident angle defined as an angle between the direction along which the ultrasonic wave travels and the direction perpendicular to the surface on which the ultrasonic wave is reflected, is satisfied. The most important parameter involved with an elastic surface wave is a phase velocity $V_p$ defined by a formula:

$$V_p = \frac{V}{\sin \theta}$$

wherein:

$V$ is the velocity of an ultrasonic wave in a material in which the ultrasonic wave is transmitted, and $\theta$ is the incident angle defined as an angle between the direction along which an ultrasonic wave travels and the direction perpendicular to the surface on which the sound is reflected.

An exemplary apparatus employing ultrasonic transducers is an ultrasonic acoustic microscope, which is employable for inspecting various physical characteristics of materials. Referring to the drawings, an ultrasonic acoustic microscope available in the prior are is described below. Referring to FIG. 1, a high frequency oscillator 9 supplies a high frequency electric signal having a frequency selected from the frequency range of 10 through 1,000 MHz towards an ultrasonic transducer 10 for generating an ultrasonic wave, which is transmitted through a delay element (an acoustic lens) 11 made of fused quartz etc. and which has a concave surface 11a at the bottom surface thereof. The reason why the delay element (an acoustic lens) 11 is concave surface 11a at the bottom thereof is to focus the ultrasonic wave on a small area (a focusing point) 11b on the surface of a specimen. The effect of focusing an ultrasonic wave or for condensing an ultrasonic beam is realized by the difference in velocity of an ultrasonic wave traveling in a delay element 11 and the velocity of an ultrasonic wave traveling in an ultrasonic transmission liquid 12. A specimen 13 is placed on a table 18a driven by an X-Y table drive 18, facing the foregoing concave surface 11a of the delay element (acoustic lens) 11 through an ultrasonic transmission liquid 12, which is usually water.

The inherent function of an ultrasonic transmission liquid is to cause an ultrasonic wave to readily pass therethrough. Therefore, any material can be employed for this purpose. For the purpose of providing a focusing effect, however, a material which is usually employed as the ultrasonic transmission liquid is selected from the group of materials in which an ultrasonic wave travels more slowly than in the delay element. Therefore, water is usually employed as the ultrasonic transmission liquid.

Since the X-Y table drive 18 is allowed to move in the X and Y directions, a focusing point 11b of the ultrasonic wave is allowed to scan along the surface of the specimen 13. The ultrasonic wave reflected on the surface of or inside the specimen 13 returns to the ultrasonic transducer 10, which acts as an ultrasonic receiver in this case, to be converted to a high frequency electric signal, which is input to a detector 16 through a circulator 14. The detector 16 detects the electric signal to employ the same for various purposes including displaying or the like using a display means 17 or the like.

As was described above, ultrasonic acoustic microscopes available in the prior art are designed to have a single ultrasonic transducer 10 accompanied by a single delay element (acoustic lens) 11 having a concave surface 11a or a single ultrasonic transducer 10 having a concave surface (not shown). This causes various inherent disadvantages including a loss of magnitude in accuracy and sensitivity and difficulties in employing the resultant signals for quantitative treatment, such difficulties being caused by the nature of the signals, although the signals can be employed for displaying images on a display means.

One of the exceptions in which ultrasonic acoustic microscopes available in the prior art can be employed for quantitative measurement would be "The V (Z) curve method," which is employable for measurement of the phase velocity of an elastic surface wave, the phase velocity depending on the physical conditions of the layer structure and the physical parameters etc. of a specimen on which an ultrasonic wave is reflected. The procedure of this method is to measure the intensity of the reflected ultrasonic wave, during a period in which the concave surface 11a of the delay element (the acoustic lens) 11 or the concave surface (not shown) of an ultrasonic transducer is moved in the vertical direction. The relations between the measured intensity of the reflected ultrasonic wave and the distance between the concave surface 11a of the delay element (the acoustic lens) 11 or the concave surface (not shown) of an ultrasonic transducer and the surface of the specimen 13 turn out to be oscillatory, as is illustrated in FIG. 2. Referring to FIG. 2, the Y-axis represents the measured intensity of the reflected ultrasonic wave, and the X-axis represents the distance between the concave surface 11a of the delay element (the acoustic lens) 11 or the concave surface (not shown) of an ultrasonic transducer and the surface of the specimen 13. Referring to the drawing, T represents a period which is determined depending on the phase velocity, which further depends on the elastic modulus of the material of the specimen 13. In this manner, an ultrasonic acoustic microscope available in the prior art can be exceptionally employed for measurement of and/or sensing various physical characteristics including the measurement of the thickness of each layer constituting a piled objective.

This exceptional method for employing ultrasonic acoustic microscopes available in the prior art for quantitative measurement is, however, inevitably accompanied by a disadvantage in that a longer time is required for measurement, because the measurement procedure consists of a plurality of two independent steps including a plurality of vertical moves of the ultrasonic transducer !0 and a plurality of horizontal scanning movements of the same.

In the final analysis, ultrasonic acoustic microscopes available in the prior art are not free from disadvantages. In particular, it is not easy to employ the ultrasonic acoustic microscopes available in the prior art for purposes of quantitative measurement in a satisfactory magnitude of accuracy and sensitivity, and at the same time lessen the length of time required therefor.

The remove the foregoing drawbacks, ultrasonic transducer assemblies illustrated in FIGS. 3 and 4 were developed.

Referring to FIG. 3, the first one of the ultrasonic transducer assemblies is defined as a pair of ultrasonic transducers 10a each of which is a piezoelectric body e.g. a zinc oxide film 101a sandwiched by a pair of electrodes 102a and each of which has a concave surface facing a specimen from which an ultrasonic wave is emitted toward (or received from) the specimen.

Referring to FIG. 4, the second one of the ultrasonic transducer assemblies is defined as a pair of ultrasonic transducers 10b each of which is a piezoelectric body e.g. a zinc oxide film 101b sandwiched by a pair cf electrodes 102b and each of which has a flat surface from which an ultrasonic wave is emitted toward (or received from) the specimen and each of which is inclined by θ with respect to the direction perpendicular to the surface of a specimen.

These ultrasonic transducer assemblies are employable for converting a high frequency electric signal to an ultrasonic wave and for emitting the same toward the surface of a specimen and for receiving the ultrasonic wave reflected on the surface of the specimen and for converting the ultrasonic wave to a high frequency electric signal.

Each of the foregoing ultrasonic transducer assemblies can be employed for an ultrasonic acoustic microscope. Therefore, referring to the drawings, an ultrasonic acoustic microscope employing the foregoing second one of the ultrasonic transducer assemblies or the ultrasonic transducer assembly having two ultrasonic transducers each of which has a flat surface for emitting or receiving an ultrasonic wave will be described below.

Referring to FIG. 5, a high frequency oscillator 9 supplies a high frequency electric signal A towards an ultrasonic transducer assembly 100b which has a pair of ultrasonic transducers 10b each of which has a flat surface for emitting or receiving an ultrasonic wave and is supported by a supporter 10c made of e.g. a resin body. Further, the ultrasonic transducers 10b attached by the supporters 10c are bridged with each other by an ultrasonic transducer holder 100c. An ultrasonic wave emitted by the ultrasonic transducer 10b travels in an ultrasonic transmission liquid (for example, water) 12 towards a specimen 13 supported by a table 18a driven by an X-Y table drive 18. Since this ultrasonic acoustic microscope does not use a delay element, the function of the ultrasonic transmission liquid 12 is limited to that of passing therethrough the transmitted ultrasonic wave. In this sense, any material which allows an ultrasonic wave to pass therethrough can be employed as a material for an ultrasonic transmission liquid. The ultrasonic wave reflected on the specimen 13 is received by the ultrasonic transducer 10b which generates an electric signal B which is applied to a spectrum analyzer 16a. A display means 17 or the like can be additionally employed for enabling a visual inspection to be implemented on a screen.

Referring to drawings, including FIG. 5, 6 and 7, an example of the procedure for measuring the thickness of a layer plated on a substrate will be described below. Each of the ultrasonic transducers 10b each of which is a piezoelectric body e.g. a zinc oxide plate 101b sandwiched by a pair of electrodes 102b and each of which has a flat surface is inclined by an angle θ with respect to the direction perpendicular to the surface of a specimen 13 which is a plied body having a layer 13b plated on a substrate 13a. An electric impulse signal A is applied to the ultrasonic transducer of an ultrasonic transducer assembly 100b which is immersed in an ultrasonic transmission liquid 12, for example water. An ultrasonic wave C emitted from the ultrasonic transducer 10b and travelling in the ultrasonic transmission liquid (water) 12 is reflected on the surface of or inside the layer 13b having a thickness "d" and which is plated on a substrate 13a. The reflected ultrasonic wave D contains plural ultrasonic waves having frequencies different from one another. The reflected ultrasonic wave D is received by an ultrasonic transducer 10b and is converted to another electric signal B containing plural components having various frequencies. A frequency analysis procedure is applied to the electric signal B for determining the intensity or amplitude of each signal component of which the frequency is different from one another, for thereby determining the distribution of the intensity of the signal components with respect to the frequency thereof.

Provided an optimum angle $\theta_1$ is selected as the incident angle $\theta$, a dip frequency $f_1$ at which the intensity of the reflected ultrasonic wave turns out to be minimum is observed as is illustrated in FIG. 7. Referring to FIG. 7, acceptable is a formula:

$$f_1 \times d = C$$

wherein

F$_1$ is a dip frequency, d is the thickness of a layer, and

C is a constant determined depending on the physical characteristics of the material including the substrate, the layer and an ultrasonic transmission liquid and depending on the dip angle $\theta_1$.

Based on this function, the thickness "d" of a layer 13b is allowed to be determined.

Based on the same principle, inspection of the magnitude of adhesion of a layer (not shown) plated on a substrate (not shown) is allowable.

In addition, the foregoing ultrasonic acoustic microscope can be employed for various purposes for measurement of the physical characteristic of a material.

OBJECTS OF THE INVENTION

The present invention aims at resolving specific drawbacks of the prior art. In particular, an ultrasonic transducer assembly having a structure as illustrated in FIG. 4 involves the following drawbacks, as tabulated below:

1. No resolving power is allowable. In other words, this ultrasonic transducer assembly emits ultrasonic waves of which the wave front is not curved or having travelling directions which are parallel to each other. Therefore, this ultrasonic transducer assembly has no function to condense an ultrasonic wave. In cases where the physical characteristics of a specimen are uniform along the surface thereof, this limitation poses no problem. However, in cases where a small area is required to be observed, the area of the ultrasonic transducer 10b is required to be small accordingly. Since the area of the ultrasonic transducer 10b cannot easily be made so small, and since an ultrasonic transducer 10b having a small ultrasonic emitting or receiving area generates or receives a signal small in intensity, this is a drawback. In other words, an ultrasonic transducer assembly capable of achieving a resolving power is preferable.

2. In cases where the ultrasonic transducer assembly is employed for a process which includes a procedure for determining a dip frequency, the incident angle $\theta$ must be precisely adjusted to the optimum angle $\theta_1$. Since an ultrasonic transducer assembly is generally designed as one body combined with an ultrasonic transducer holder 100c and housed in a case 100d, as is illustrated in FIG. 8, the ultrasonic transducer assembly is not capable of freely changing the angles between the center lines of the ultrasonic generator 10b and receiver 10b. As a result, it is generally difficult for an ultrasonic transducer assembly to adjust the incident angle $\theta$, because a reduction in the incident angle $\theta$ is inevitably accompanied by an increase in the reflection angle, and vice versa. Therefore, this ultrasonic transducer assembly is inconvenient for purposes in which a selection of the incident angle is required.

3. The incident angle $\theta_1$ corresponding to a dip frequency $f_1$ is required to be precisely fit for the ultrasonic generator 10b and for the ultrasonic receiver 10b. It is inconvenient even if the ultrasonic transducer assembly is designed to allow adjustment of the incident angles, as is illustrated in FIG. 9, in which each of the ultrasonic generator 10b and receiver 10b is supported by an arch shaped worm 100f penetrating each of the supporters 10c, wherein the arch shaped worm 100f is driven by a gear 100g further driven by a screw 100h. In such an apparatus, it is not easy for the incident angle $\theta$ of the ultrasonic generator 10b and receiver 10b to a accurately adjusted.

Furthermore, an ultrasonic transducer assembly having a structure as illustrated in FIG. 3 involves the following drawbacks described below.

The accuracy of the transducer assembly is entirely unsatisfactory. Since each of the ultrasonic generator 10a and the ultrasonic receiver 10a has a concave surface, the ultrasonic waves emitted therefrom or received thereby are condensed at a point. The ultrasonic wave, however, comprises a plurality of various ultrasonic waves of which the incident angles (which are identical to the corresponding reflection angles) are different from one another. Hence, it is impossible to restrict the incident angle $\theta$ to an optimum angle $\theta_1$, resulting in a drastic lowering of accuracy, when the apparatus is employed for a procedure in which an optimum angle $\theta_1$ is important.

It would be needless to refer to a possibility in which the ultrasonic transducers 10a constituting the ultrasonic transducer assembly illustrated in FIG. 3 can be replaced by a combination of a flat surface ultrasonic transducer 10b and a delay element (not shown but similar to the one illustrated in FIGS. I and II) having a concave surface at the bottom thereof.

Secondly, an ultrasonic acoustic microscope employing the ultrasonic transducer assembly having a structure illustrated in FIG. 4 cannot be free from the disadvantages specific to the ultrasonic transducer assembly having a structure as illustrated in FIG. 4.

On the other hand, an ultrasonic acoustic microscope employing the ultrasonic transducer assembly having a structure illustrated in FIG. 3 likewise cannot be free from the disadvantages specific to the ultrasonic transducer assembly having a structure as illustrated in FIG. 3. The situation remains unchanged, even if the ultrasonic transducers 10a constituting the ultrasonic transducer assembly illustrated in FIG. 3 are replaced by a combination of a flat surface ultrasonic transducer 10b and a delay element (which is similar to the one illustrated in FIGS. 1 and 11) having a concave surface at the bottom thereof. The only difference is limited to the physical significance of the ultrasonic transmission liquid, which becomes essential for the ultrasonic transducer assembly consisting of two flat ultrasonic transducers accompanied by delay elements, for acquisition of the resolving power.

Accordingly, the first object of this invention is to provide an ultrasonic transducer assembly which is accurate, which has a resolving power, and which has versatility of selection or adjustment of the inclination of each ultrasonic generator and each ultrasonic receiver with respect to a specimen and which is simple in employment thereof.

The second object of this invention is to provide an ultrasonic acoustic microscope which is accurate, which has a resolving power, and which has versatility of selection or adjustment of the inclination of each ultrasonic generator and each ultrasonic receiver with respect to a specimen and which is simple in employment thereof.

SUMMARY OF THE INVENTION

Firstly, either of the two independent ultrasonic transducer assemblies described below is allowed to achieve the first object of this invention.

A first ultrasonic transducer assembly in accordance with this invention is provided with an ultrasonic transducer 10a provided with a curved plate of a piezoelectric body e.g. a zinc oxide curved plate 101a sandwiched by a pair of electrodes 102a and having a concave surface on the surface from which an ultrasonic wave is emitted or received, an ultrasonic transducer 10b provided with a flat plate of a piezoelectric body e.g. a zinc oxide flat plate 101b sandwiched by a pair of electrodes 102b and having a flat surface from which an ultrasonic wave is emitted or received, and an ultrasonic transducer holder 100c for supporting the foregoing two independent ultrasonic transducers 10a and 10b maintaining a fixed angle α therebetween.

The concave surface is allowed to be a spherical concave surface to make a point focus or a cylindrical concave surface to make a line focus.

Either of the foregoing ultrasonic transducers 10a and 10b is allowed to be employed either for generating or for receiving an ultrasonic wave.

Since each of the ultrasonic transducer 10a and the ultrasonic transducer 10b is small and thin, supporters 10c are actually employed for supporting the ultrasonic transducers 10a and 10b.

A second ultrasonic transducer assembly in accordance with this invention is provided with an ultrasonic lens 101c comprising an ultrasonic transducer 10b provided with a flat plate of a piezoelectric body e.g. a zinc oxide flat plate 101b sandwiched by a pair of electrodes 102b, the ultrasonic transducer 10b being attached by a delay element 11c having a concave surface from which an ultrasonic wave is emitted or received, an ultrasonic lens 101d comprising an ultrasonic transducer 10b provided with a flat plate of a piezoelectric body e.g. a zinc oxide flat plate sandwiched by a pair of electrodes 102b, the ultrasonic transducer 10b being attached by a delay element 11d having a flat surface from which an ultrasonic wave is emitted or received, and an ultrasonic transducer holder 100c for supporting the foregoing ultrasonic lenses 101c and 101d, maintaining a fixed angle α therebetween.

The concave surface is allowed to be a spherical concave surface to make a point focus or a cylindrical concave surface to make a line focus.

Either of the foregoing ultrasonic lenses 101c and 101d is allowed to be employed either for generating or for receiving an ultrasonic wave.

Secondly, either of the two independent ultrasonic acoustic microscopes described below is allowed to achieve the second object of this invention.

A first ultrasonic acoustic microscope in accordance with this invention is provided with a high frequency oscillator 9, an ultrasonic transducer assembly 100i comprising an ultrasonic transducer 10a provided with a curved plate of a piezoelectric body 101a sandwiched by a pair of electrodes 102a having a concave surface from which an ultrasonic wave is emitted or received, an ultrasonic transducer 10b provided with a flat plate of a piezoelectric body 101b sandwiched by a pair of electrodes 102b having a flat surface from which an ultrasonic wave is emitted or received, and an ultrasonic transducer holder 100c for supporting the foregoing ultrasonic transducers 10a and 10b, maintaining a fixed angle α therebetween, an X-Y table 18 having a table 18a on which a specimen 13 is placed, a spectrum analyzer means 16a, and a display means 17.

Either of the foregoing ultrasonic transducers 10a and 10b is allowed to be employed either for generating or for receiving an ultrasonic wave.

As was described above for the foregoing first ultrasonic transducer assembly 100i in accordance with this invention, the concave surface is allowed to be a spherical concave surface or a cylindrical concave surface for respectively focusing on a point or along a line.

Since each of the ultrasonic transducer 10a and the ultrasonic transducer 10b is small and thin, supporters 10c are actually employed for supporting the ultrasonic transducers 10a and 10b.

A second ultrasonic acoustic microscope in accordance with this invention comprises a high frequency oscillator 9, an ultrasonic transducer assembly 100j comprising an ultrasonic lens 101c having an ultrasonic transducer 10b provided with a flat plate of a piezoelectric body e.g. a zinc oxide flat plate 101b sandwiched by a pair of electrodes 102b, the ultrasonic transducer 10b being attached by a delay element 11c having a concave surface from which an ultrasonic wave is emitted or received, an ultrasonic lens 101d having an ultrasonic transducer 10b provided with a flat plate of a piezoelectric body e.g. a zinc oxide flat plate sandwiched by a pair of electrodes 102b, the ultrasonic transducer 10b being attached by a delay element 11d having a flat surface from which an ultrasonic wave is emitted or received, and an ultrasonic transducer holder 100c for supporting the foregoing ultrasonic lenses 101c and 101d, maintaining a fixed angle α therebetween, an X-Y table 18 having a table 18a on which a specimen 13 is placed, a spectrum analyzer means 16b and a display means 17.

As was described above for the foregoing second ultrasonic transducer assembly 100j in accordance with this invention, the concave surface is allowed to be a spherical concave surface or a cylindrical concave surface for respectively focusing on a point or along a line.

Either of the foregoing ultrasonic lenses 101c and 101d is allowed to be employed either for generating or for receiving an ultrasonic wave.

BRIEF DESCRIPTION OF THE DRAWINGS

A more detailed description will be presented below for ultrasonic transducer assemblies in accordance with this invention and for ultrasonic acoustic microscopes in accordance with the invention, referring to the drawings tabulated below.

DETAILED DESCRIPTION OF THE PREFERRED EMBODIMENTS

Ultrasonic Transducer Assembly

First Embodiment:

An ultrasonic transducer assembly in accordance with this embodiment employs supporters 10c for supporting ultrasonic transducers each of which is not accompanied by a delay element.

Figures 1, 2:
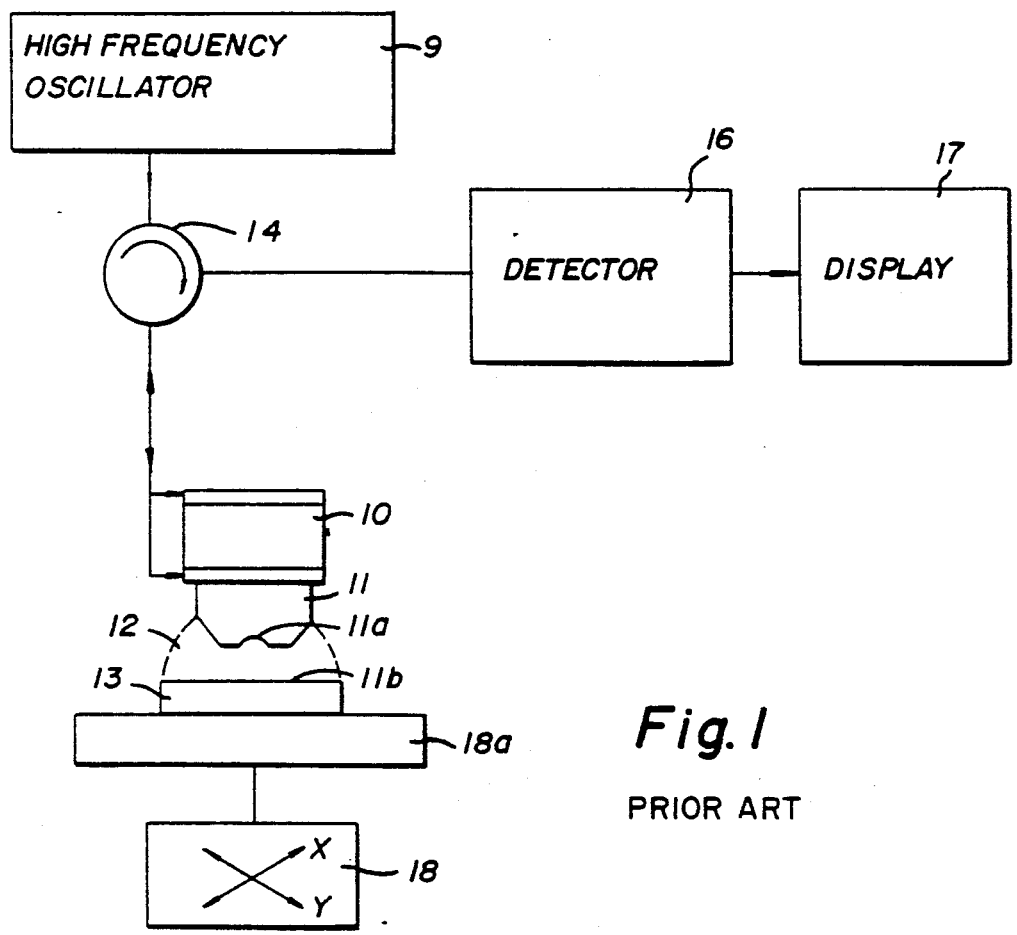
FIG. 1 is a schematic drawing of an ultrasonic acoustic microscope available in the prior art.
FIG. 2 is a graph illustrating a result of "the V (Z) curve method,"
Figure 3:
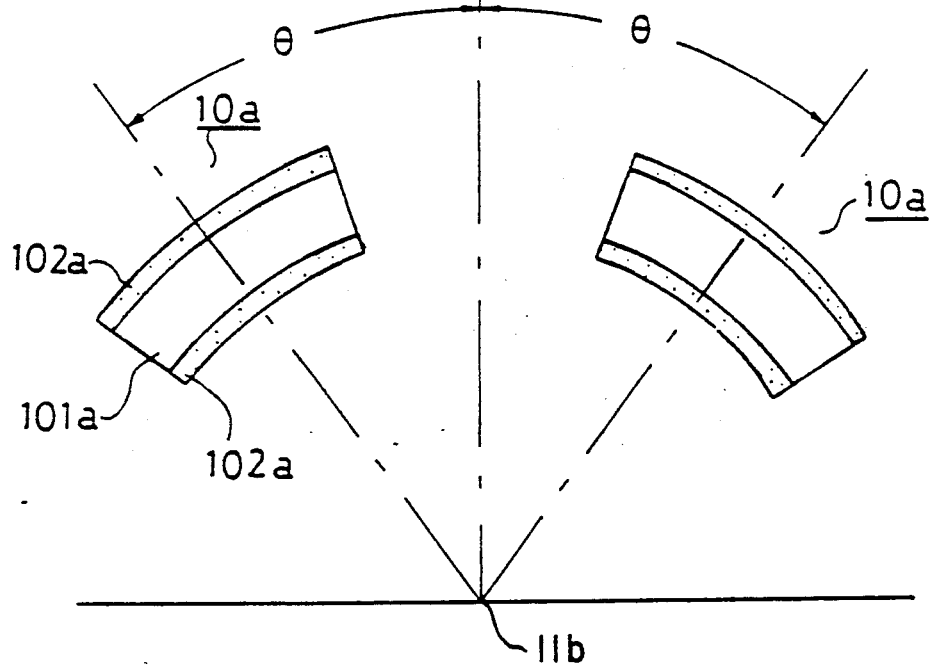
FIG. 3 is a drawing illustrating a schematic arrangement of ultrasonic transducers employed in an ultrasonic transducer assembly having a concave shaped ultrasonic wave emitting surface, available in the prior art.
Figure 10:
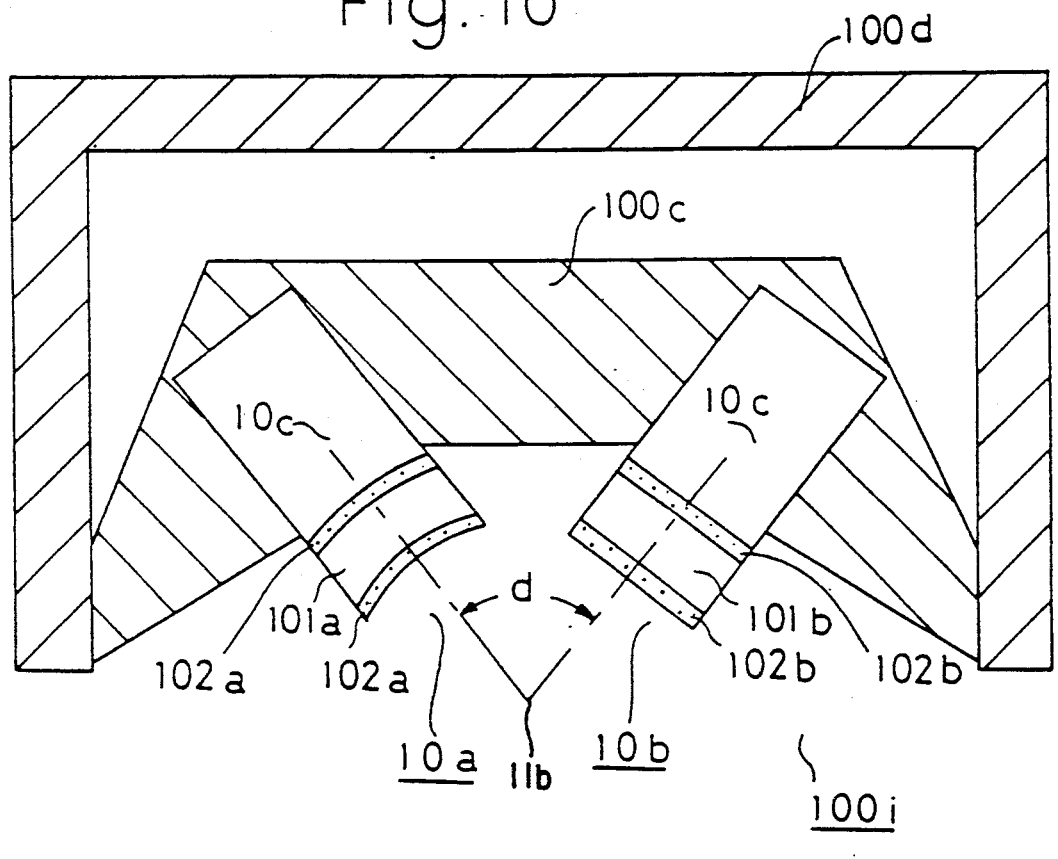
FIG. 10 is an overall cross-sectional view of an ultrasonic transducer assembly in accordance with the first embodiment of ultrasonic transducer assemblies of this invention.

Referring to FIG. 10, an ultrasonic transducer 10a is identical to the one illustrated in FIG. 3. In other words the ultrasonic transducer 10a is a curved plate of a piezoelectric body 101a e.g. a zinc oxide curved film having a concave surface on one side, the curved plate 101a being sandwiched by a pair of electrodes e.g. gold films 102a. One of the electrodes 102a located on the side opposite to the ultrasonic wave emitting surface is attached by a supporter 10c made of a resin or the like. An ultrasonic transducer 10b is identical to the one illustrated in FIG. 4. In other words, the ultrasonic transducer 10b is a flat plate of a piezoelectric body 101b e.g. a zinc oxide flat film having a flat surface sandwiched by a pair of electrodes e.g. gold films 102b. One of the electrodes 102b located on the side opposite to the ultrasonic wave emitting surface is attached by a supporter 10c made of a resin or the like. The ultrasonic transducers 10a and 10b are connected with each other by an ultrasonic transducer holder 100c. When the concave surface is a spherical concave surface, the emitted ultrasonic wave focuses on a point, and when the concave surface is a cylindrical concave surface, the emitted ultrasonic wave focuses along a line.

The foregoing ultrasonic transducers 10a or 10b can be produced by employing an evaporation process or a spattering process for depositing a gold film 102a or 102b, a zinc oxide file 101a or 101b and a gold film 102a or 102b, in this order, on a supporter 10c made of a resin or the like having a flat surface or a concave surface respectively.

A pair of the foregoing ultrasonic transducers 10a and 10b is held by an ultrasonic transducer holder 100c, maintaining an angle $\alpha$ between the center lines of the ultrasonic transducers 10a and 10b, before being further housed in a case 100d.

In the foregoing manner, an ultrasonic transducer assembly 100i in accordance with the first embodiment of this invention is produced.

It is readily understood that some means e.g. a screw or the like is arranged around the external surface of the case 100d of the ultrasonic transducer assembly 100i for fitting the same to the body tube of an ultrasonic acoustic microscope.

Since each of the ultrasonic transducers 10a and 10b of this ultrasonic transducer assembly 100i is not accompanied by a delay element, the focusing point 11b is identical to the center of curvature of the concave surface of the ultrasonic transducer 10a.

It would be needless to refer to an ultrasonic transmission liquid which is usually employed with this ultrasonic transducer assembly, because it is actually essential for efficient transmission of ultrasonic waves.

Functioning of the ultrasonic transducer assembly 100i in accordance with this embodiment will be described below.

Figure 4:
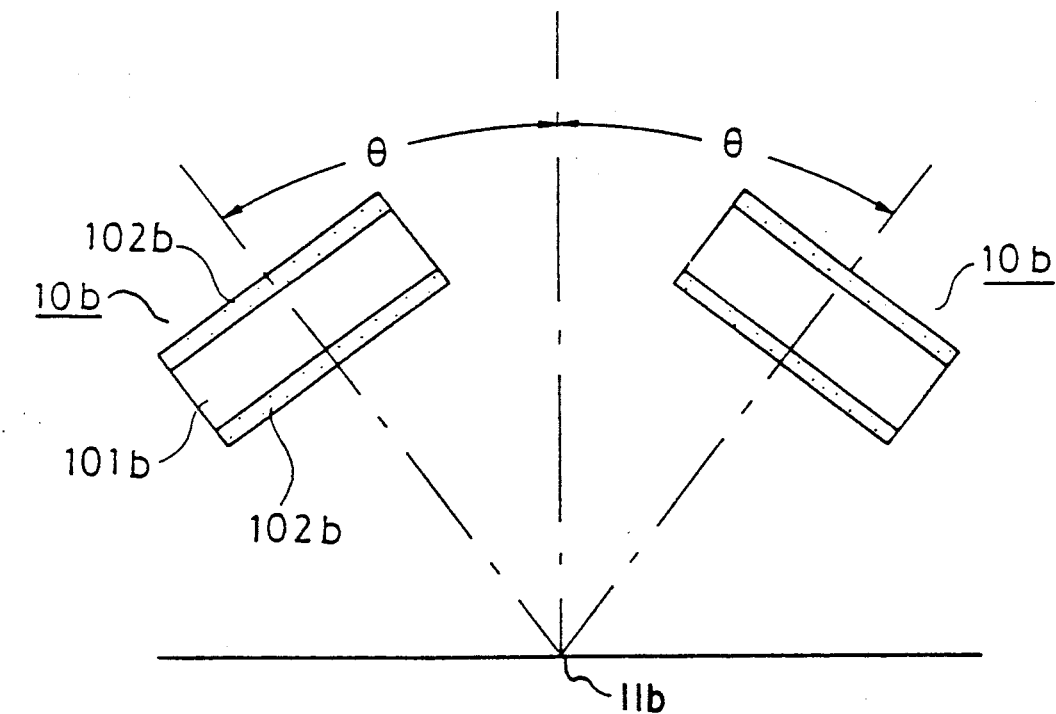
FIG. 4 is a drawing illustrating a schematic arrangement of ultrasonic transducers employed in an ultrasonic transducer assembly having a flat shaped ultrasonic wave emitting surface, available in the prior art.
Figure 11:
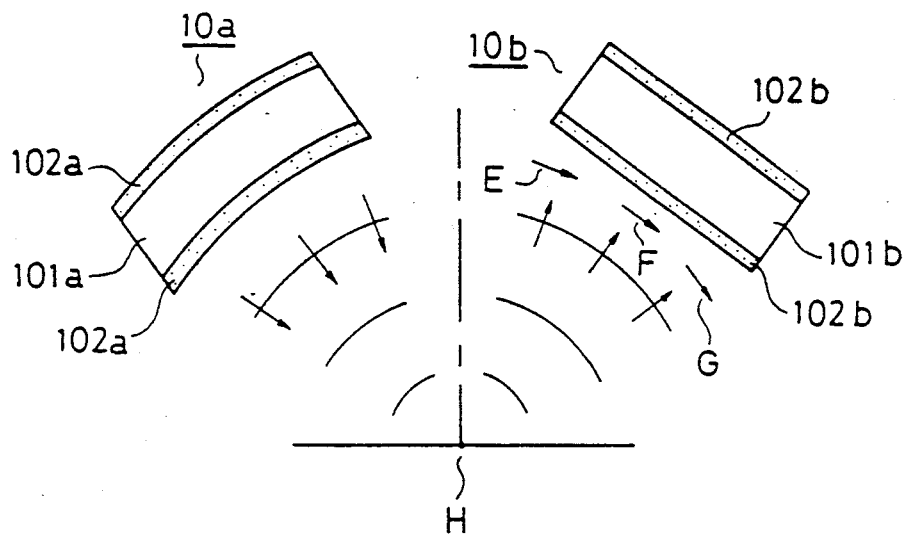
FIGS. 11, 12 and 13 are schematic drawings explaining the function of an ultrasonic transducer assembly in accordance with the first embodiment of ultrasonic transducer assemblies of this invention for the case in which an ultrasonic transducer having a concave surface is employed for emitting or receiving an ultrasonic wave.
Figure 12:
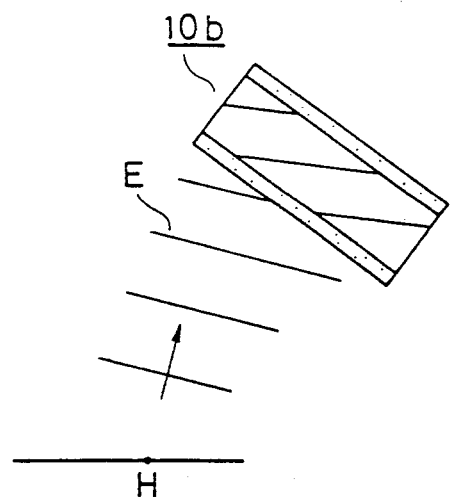
Figure 13:
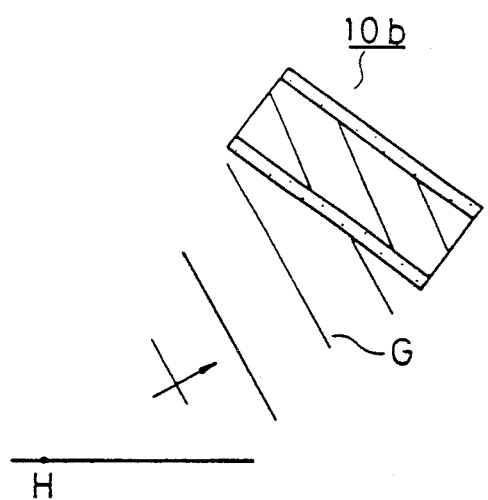

Referring to FIG. 11, since the ultrasonic transducer 10a emits an ultrasonic wave from a concave shaped surface, as is illustrated by arrows, the wave front is curved, as is illustrated by a part of a circle. Thus, it can be interpreted that the ultrasonic transducer 10b receives a combination of ultrasonic waves E, F and G, each of which has a wave front whose direction is different from the other but each of which originates from a single point H. Referring to FIGS. 12 and 13, the reflected ultrasonic wave components E and G can hardly be effective to generate a corresponding electric signal, and the ultrasonic transducer 10b actually receives an ultrasonic wave component F alone, which has a wave front parallel to the surface of the ultrasonic transducer 10b, out of the various ultrasonic waves originating from the point H. Incidentally, however, the components E and G furnish energy to some extent for oscillating the ultrasonic transducer 10b. Therefore, the intensity generated by the ultrasonic transducer 10b turns out to be much larger than the intensity generated by an ultrasonic transducer of an ultrasonic transducer assembly consisting of two flat ultrasonic transducers, each of which has a small area for emitting an ultrasonic wave or of an ultrasonic transducer assembly consisting of two flat ultrasonic transducers, as illustrated in FIG. 4, but having small area for emitting ultrasonic waves. Therefore, the electric signal generated by the ultrasonic transducer 10b is a signal which is strong in magnitude and faithfully represents the physical characteristics, particularly the elastic characteristics, of the of the specimen material at a point H which is small in area.

This means that the ultrasonic transducer assembly 100i is allowed to have a resolving power in the sense that the incident ultrasonic wave is gathered at a point which is the focus of the ultrasonic transducer which has a concave surface 10a, and that the ultrasonic transducer assembly 100i is allowed to have an excellent magnitude of accuracy in the sense that the ultrasonic transducer which has a flat surface 10b receives only the ultrasonic waves reflected with the optimum reflection angle.

Figure 14:
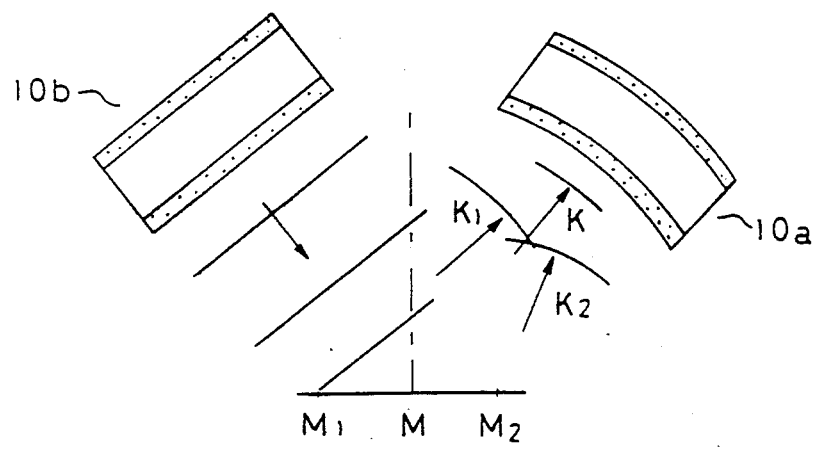
FIGS. 14, 15 and 16 are schematic drawings explaining the function of an ultrasonic transducer assembly in accordance with the first embodiment of ultrasonic transducer assemblies of this invention for the case in which a flat surface ultrasonic transducer is employed for emitting or receiving an ultrasonic wave.
Figure 15:
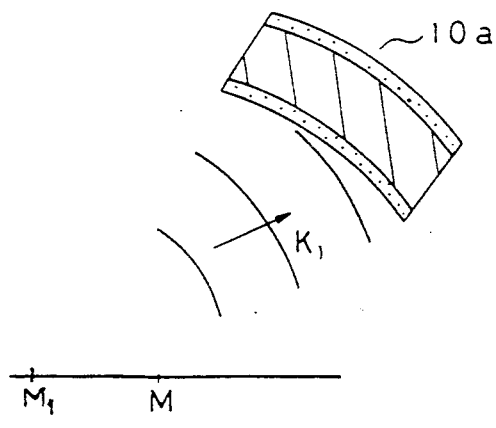
Figure 16:
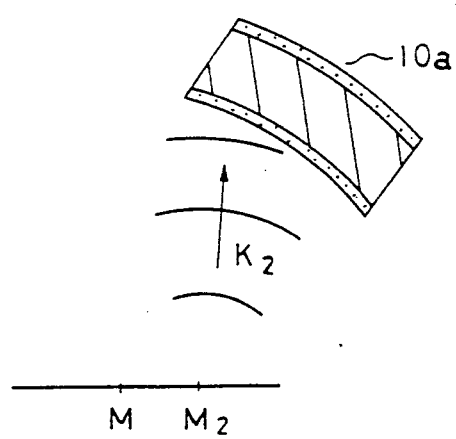

Also in the case where the flat shaped transducer 10b is employed as an ultrasonic generator and the concave shaped transducer 10a is employed as an ultrasonic receiver, a similar effect is observed, as is clear from FIGS. 14, 15 and 16.

Referring to FIG. 14, since the ultrasonic transducer 10b emits an ultrasonic wave from a flat shaped surface in the direction illustrated by the arrow, as is illustrated by plural straight lines illustrated in parallel with each other, the ultrasonic waves collide not only at a point M but also at various points including $M_1$ and $M_2$. Therefore, the ultrasonic transducer 10a receives ultrasonic waves from various directions including K, $K_1$, $K_2$, and the like, and not only from the point M but also from points $M_1$, $M_2$ and the like. Referring to FIGS. 15 and 16, the ultrasonic waves $K_1$ and $K_2$ originating respectively from the points $M_1$ or $M_2$ can hardly be effective to generate a corresponding electric signal, and the ultrasonic transducer 10a actually receives an ultrasonic wave K originating from the point M. It is noted, however, that the concave shaped ultrasonic transducer 10a receives the ultrasonic wave K having a wide spacial angle corresponding to the aperture angle of the ultrasonic transducer 10a. This means that the ultrasonic transducer assembly 100i is allowed to perform effects similar to those which were described above referring to FIGS. 11 through 13, even in the case where the flat shaped ultrasonic transducer 10b is employed as an ultrasonic generator and the concave shaped ultrasonic transducer 10a is employed as an ultrasonic receiver, as is illustrated in FIG. 14. In other words, the ultrasonic transducer assembly 100i is allowed to sense the physical characteristics, particularly the elastic characteristics, of a small area of a specimen with high accuracy, regardless of the way in which the arrangement of the flat transducer and the concave transducer is selected.

Figure 17:
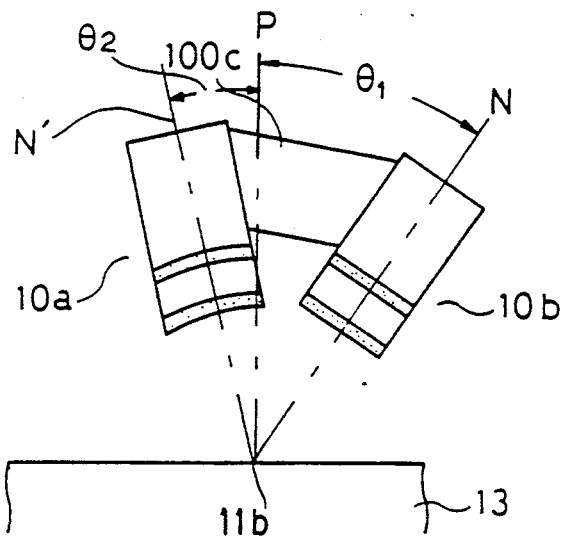
FIG. 17 is a schematic drawing explaining one of the results of the ultrasonic transducer assembly in accordance with this invention.

The above description means that the ultrasonic transducer assembly 100i can be arranged at its optimum incident angle $\theta_1$ by a simplified procedure. Referring to FIG. 17, the ultrasonic transducer assembly 100i can be arranged at its optimum incident angle $\theta_1$ by tilting the holder 100c and adjusting only the angle between the direction N perpendicular to the flat surface of the ultrasonic transducer 10b having a flat surface and the direction P perpendicular to the surface of the specimen 13. Since the ultrasonic transducers 10a and 10b are maintained at a fixed angle $\alpha$ by the holder 100c, this means that no attention is required to be paid to the angle $\theta_2$ between the center line N' of the concave shaped ultrasonic transducer 10a and the direction P perpendicular to the surface of the specimen 13, thereby realizing versatility for selection or adjustment of the inclination of the ultrasonic transducer assembly with respect to the specimen and simplifying the procedure for the employment of the ultrasonic transducer assembly.

Figure 18:
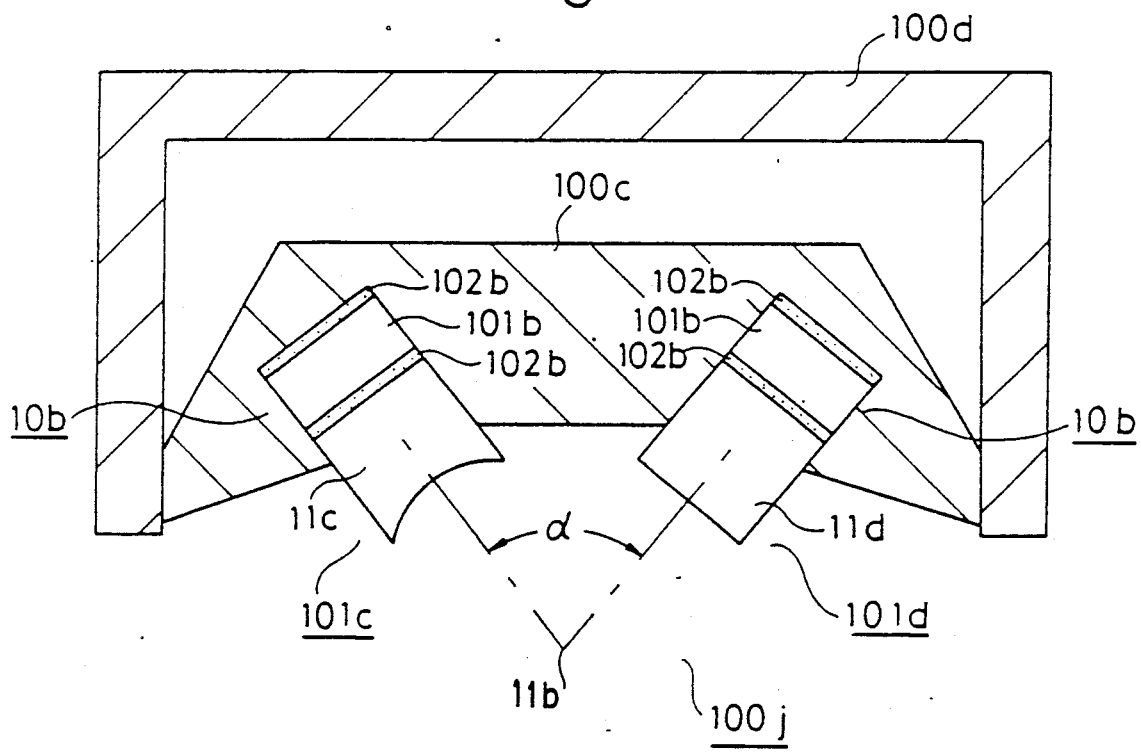
FIG. 18 is an overall cross-section view of an ultrasonic transducer assembly in accordance with the second embodiment of ultrasonic transducer assemblies of this invention.

Second Embodiment:

An ultrasonic transducer assembly in accordance with this embodiment employs delay elements for producing a resolving power or for focusing an ultrasonic wave. Referring to FIG. 18, an ultrasonic transducer 10b is identical to the one illustrated in FIG. 4. In other words, the ultrasonic transducer 10b is a flat plate of a piezoelectric body e.g. a zinc oxide film 101b having a flat surface sandwiched by a pair of electrodes e.g. gold films 102b. One of the electrodes 102b is attached by a delay element 11c or 11d. The ultrasonic transducer 10b is attached by a delay element 11c having a concave surface thereof from which an ultrasonic wave is emitted and is defined as an ultrasonic condensing lens 101c, which is a combination of a flat surface ultrasonic transducer 10b and a concave surface delay element 10c. The other ultrasonic transducer 10b is attached by a delay element 11d having a flat surface from which an ultrasonic wave is emitted, and is defined as an ultrasonic non-condensing lens 101d, which is a combination of a flat surface ultrasonic transducer 10b and a flat surface delay element 10d. The ultrasonic condensing lens 101c and the ultrasonic non-condensing lens 101d are connected with each other by an ultrasonic transducer holder 100c. When the concave surface is a spherical concave surface, the emitted ultrasonic wave focuses on a point, and when the concave surface is a cylindrical concave surface, the emitted ultrasonic wave focuses along a line.

The ultrasonic condensing lens 101c can be produced by employing an evaporation process or a spattering process for depositing a gold film 102b, a zinc oxide film 101b and a gold film 102b, in this order, on a delay element 11c having a concave surface thereof from which an ultrasonic wave is emitted or received made of fused quartz, etc. The ultrasonic non-condensing lens 101d can be produced by employing an evaporation process or a spattering process for depositing a gold film 102b, a zinc oxide film 101b and a gold film 102b, in this order, on a delay element 11d having a flat surface from which an ultrasonic wave is emitted or received, the delay element 11b being made of fused quartz etc.

The ultrasonic condensing lens 101c and the ultrasonic noncondensing lens 101d are held by an ultrasonic transducer holder 100c maintaining the angle c between the center lines of the ultrasonic condensing lens 101c and the ultrasonic non-condensing lens 101d, before being further housed in a case 100d.

In the foregoing manner, an ultrasonic transducer assembly 100j in accordance with the second embodiment of this invention is produced.

The function of ultrasonic transducer assembly 100j is identical to that of the ultrasonic transducer assembly 100i described above, except that the ultrasonic condensing lens 101c comprising a delay element 11c having a concave surface from which an ultrasonic wave is emitted or received has an effect to focus or condense an ultrasonic wave due to the difference in the velocity thereof in the delay element and in the ultrasonic transmission liquid, and that the focusing point 11b is remote from the center of curvature of the concave surface of the delay element 11c towards the direction opposite to the delay element 11c.

Further, an ultrasonic transmission liquid (not shown) is essential, because the resolving power is caused by the difference in the velocity of the ultrasonic waves in the delay element 11c and the velocity of the ultrasonic waves in the ultrasonic transmission liquid (not shown).

As is in the case of the ultrasonic transducer assembly 100i in accordance with the first embodiment of this invention, the ultrasonic transducer assembly 100j in accordance with the second embodiment of this invention is allowed to sense the physical characteristics, particularly the elastic characteristics, of a small area of a specimen with high accuracy, regardless of the way in which the arrangement of the flat transducer (comprising a delay element in this embodiment) and the concave transducer (also comprising a delay element in this embodiment) is selected. Further, as is in the case of the ultrasonic transducer assembly 100i in accordance with the first embodiment of this invention, the ultrasonic transducer assembly 100j in accordance with the second embodiment of this invention achieves versatility for selection or adjustment of the inclination of the ultrasonic transducer assembly with respect to the specimen and simplifies the procedure for the employment of the ultrasonic transducer assembly.

Ultrasonic Acoustic Microscope

First Embodiment:

An ultrasonic acoustic microscope in accordance with this embodiment employs an ultrasonic transducer assembly 100i in accordance with the first embodiment of an ultrasonic transducer assembly of this invention.

Figure 19:
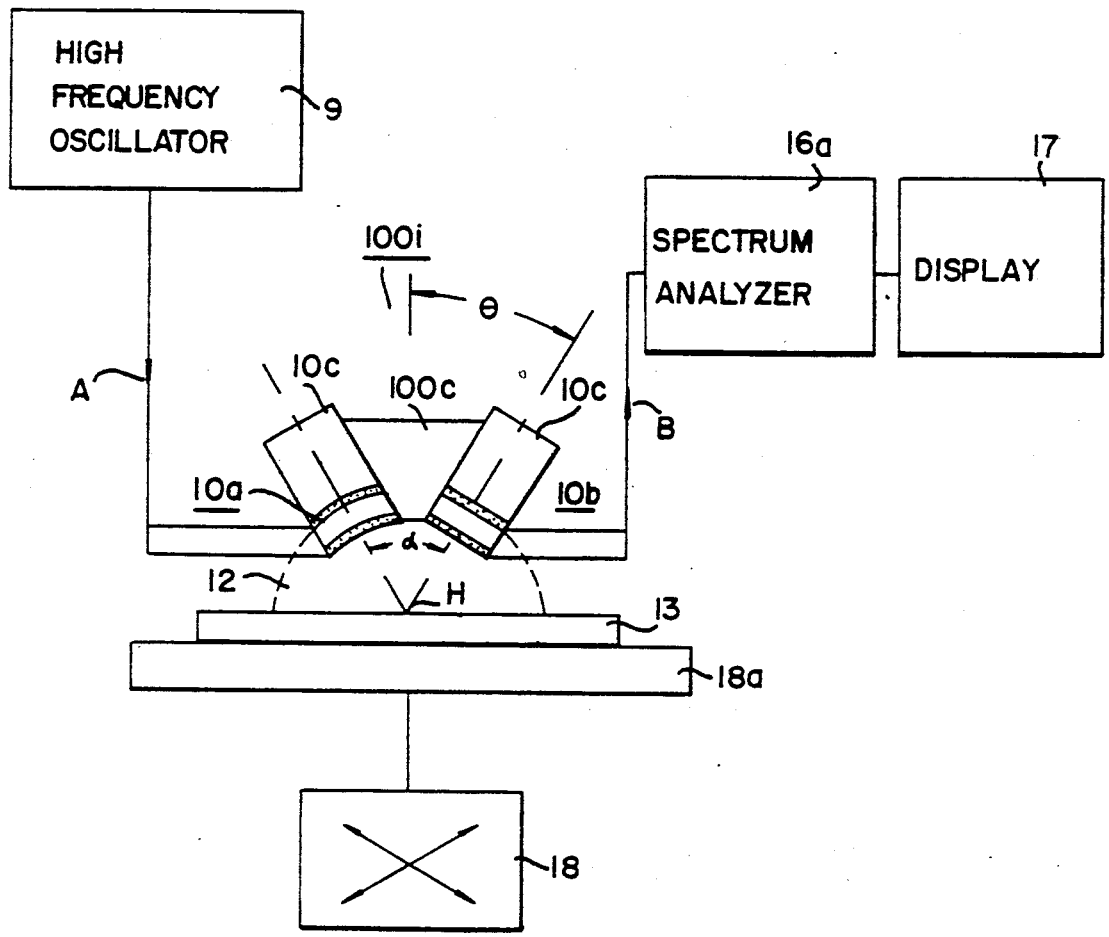
FIG. 19 is a schematic drawing an ultrasonic acoustic microscope in accordance with the first embodiment of ultrasonic acoustic microscopes of this invention.

Referring to FIG. 19, a high frequency oscillator 9 supplies a high frequency electric signal having a frequency selected from the frequency range of 10 through 1,000 Mhz towards one of the ultrasonic transducers 10a and 10b. Each of the ultrasonic transducers 10a and 10b is supported by a supporter 10c made of a resin or the like, and both ultrasonic transducers 10a and 10b are held by an ultrasonic transducer holder 100c maintaining the angle $\alpha$ between the center lines of the ultrasonic transducer 10a having a concave surface from which an ultrasonic wave is emitted and the ultrasonic transducer 10b having a flat surface from which an ultrasonic wave is emitted. Although in the foregoing combination the ultrasonic transducers 10a and 10b usually are housed in a case 100d, as is illustrated in FIG. 10, this is not illustrated in FIG. 19.

A specimen 13 is placed on a table 18a driven by an X-Y table drive 18, maintaining the ultrasonic transmission liquid 12 (actually water) between the ultrasonic transducers 10a and 10b and the specimen 13.

A high frequency electric signal, usually a burst signal A, is applied to the ultrasonic transducer 10a which emits an ultrasonic wave to be focused on a point H which is to be determined as the intersection between a direction perpendicular to the surface of a specimen 13 and the direction perpendicular to the surface of the ultrasonic transducer 10b having a flat surface for emitting or receiving an ultrasonic wave.

The ultrasonic transducer 10b having a flat surface receives an ultrasonic wave reflected at the point H and generates an electric signal B which contains plural signals having frequencies different from one another. The signal B containing a plurality of wide band signals is applied to a spectrum analyzer 16a wherein the signal is subjected to a frequency spectrum analysis process, or wherein the intensity of each signal having a frequency spread or spectrum in a wide frequency range is determined.

Provided the angle $\theta$ between the direction perpendicular to the surface of a specimen 13 and the direction perpendicular to the surface of the ultrasonic transducer 10b is the optimum angle $\theta_1$, a dip frequency $f_1$ can be obtained, as was described above, referring to FIG. 7.

Figure 7:
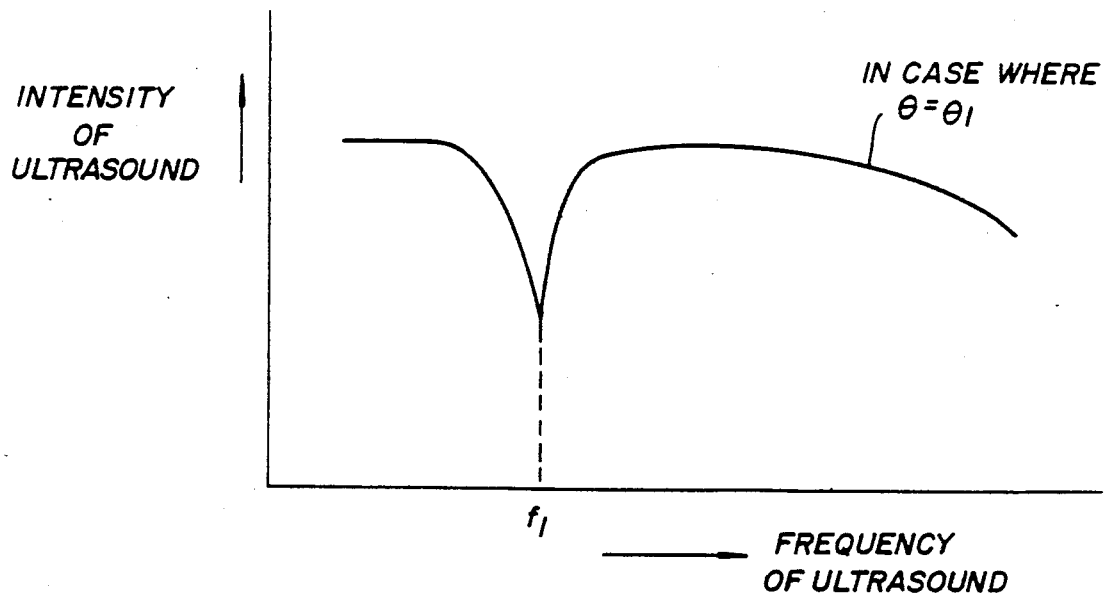
FIG. 7 is a graph explaining a dip frequency corresponding to an optimum incident angle.
Figure 8:
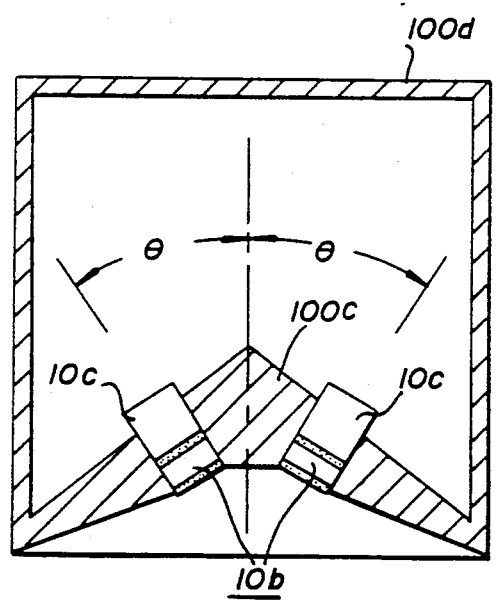
FIG. 8 is an overall cross-sectional view of an ultrasonic transducer assembly consisting of ultrasonic transducers each of which has a flat shaped ultrasonic wave emitting surface available in the prior art.
Figure 9:
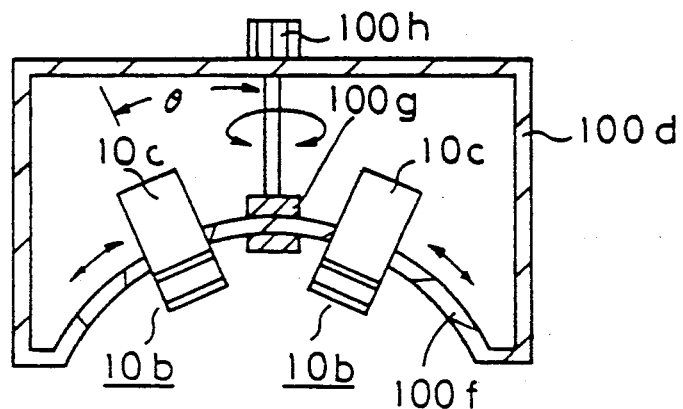
FIG. 9 is an overall cross-sectional view of an ultrasonic transducer assembly having a mechanism for adjusting the incident angle available in the prior art.

A display means 17 is employed for various purposes including the purpose of displaying a graph similar to that which is illustrated in FIG. 7.

As was described above, the function of the ultrasonic transducer assembly 100i remains unchanged, even if the flat surface ultrasonic transducer 10b is employed as an ultrasonic generator. Therefore, an ultrasonic acoustic microscope 100i provided with a combination of a concave surface ultrasonic transducer and a flat surface ultrasonic transducer allows either ultrasonic transducer 10a or 10b to be employed either as a means for generating an ultrasonic wave or as a means for receiving an ultrasonic wave.

In conclusion, an ultrasonic acoustic microscope in accordance with the first embodiment of this invention is excellent in accuracy as well as having a resolving power. Further, it achieves versatility for selection or adjustment of the inclination of each ultrasonic generator and each ultrasonic receiver with respect to a specimen and simplifies the procedure for employment thereof.

Second Embodiment:

An ultrasonic acoustic microscope in accordance with this embodiment employs an ultrasonic transducer assembly 100j in accordance with the second embodiment an ultrasonic transducer assembly of this invention.

Figure 20:
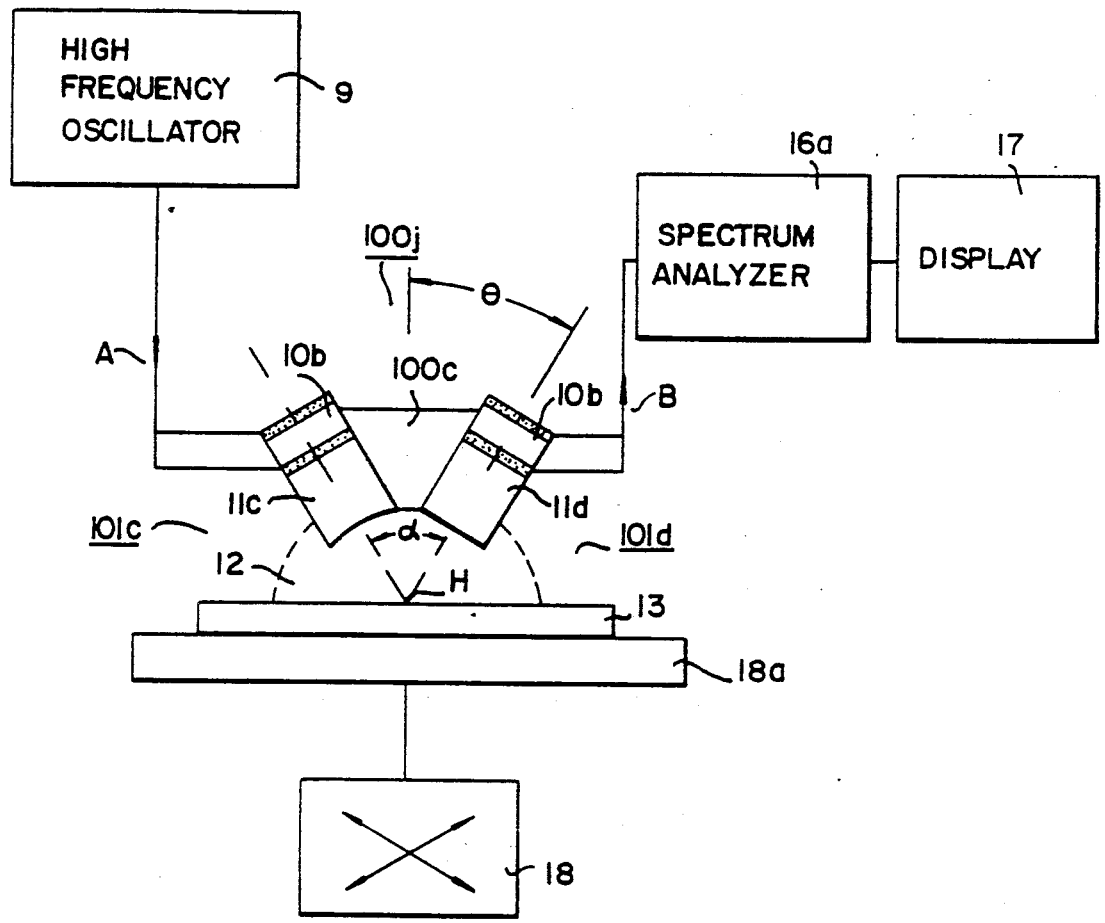
FIG. 20 is a schematic drawing of an ultrasonic acoustic microscope in accordance with the second embodiment of ultrasonic acoustic microscopes of this invention.

Referring to FIGS. 19 and 20, the difference between the ultrasonic acoustic microscope in accordance with the first embodiment and the ultrasonic acoustic microscope in accordance with the second embodiment is limited to the ultrasonic transducer assembly employed therein. Since there is no remarkable functional difference between the ultrasonic transducer assembly 100i employed for the first embodiment and the ultrasonic transducer assembly 100j employed for the second embodiment, the is no remarkable functional difference between the ultrasonic acoustic microscope in accordance with the first embodiment and the ultrasonic acoustic microscope in accordance with the second embodiment.

The only difference would be the location of the focusing point. In other words, although the focusing point 11b of the ultrasonic transducer assembly 100i is located on the center of curvature of the concave surface of the ultrasonic transducer 10a, as is illustrated in FIG. 10, the focusing point 11b of the ultrasonic transducer assembly 100j is located remote from the center of curvature of the concave surface of the delay element 11c towards the direction opposite to the delay element 11c, as is illustrated in FIG. 18.

Therefore, an ultrasonic acoustic microscope in accordance with the second embodiment of this invention is allowed to realize the same advantages which are achieved by the ultrasonic acoustic microscope in accordance with the first embodiment of this invention.

Methods for Employing an Ultrasonic Acoustic Microscope

Exemplary uses of an ultrasonic acoustic microscope in accordance with this invention include the measurement of the phase velocity of an elastic surface wave, the measurement of the dispersion curve of an elastic surface wave, and the measurement of the thickness of a layer constituting a layer structure.

Fundamental steps of each of the foregoing methods will be described below. An ultrasonic acoustic microscope in accordance with this invention is supposed to have a plurality ultrasonic transducer assemblies each of which has an angle between the center lines of the two ultrasonic transducers different from each other. This is because an incident angle defined as an angle between the center line of the flat surface ultrasonic transducer and the direction perpendicular to a specimen is required to vary step by step.

A. Measurement of the Phase Velocity of an Elastic Surface Wave

Figure 21:
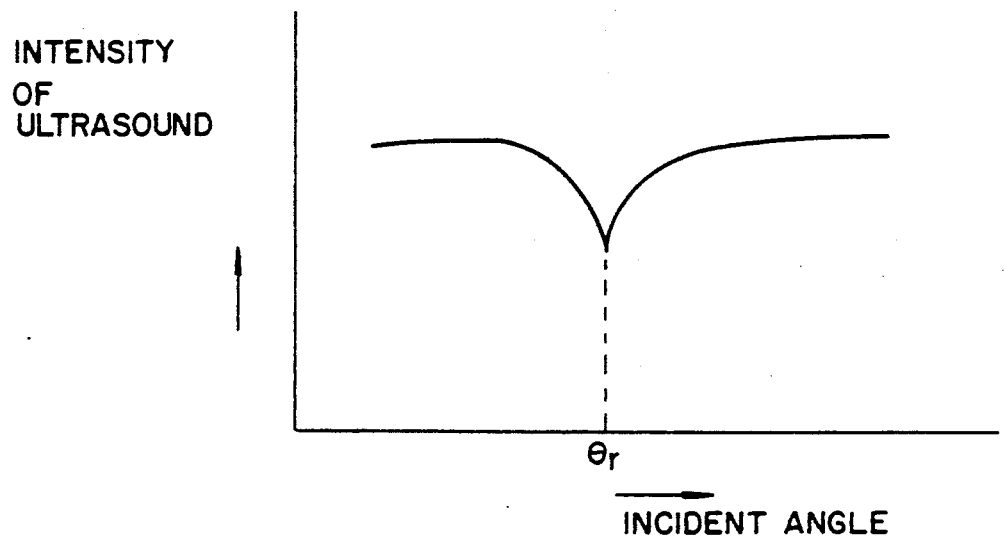
FIG. 21 is a graph illustrating the relations between the intensity of an ultrasonic wave and the corresponding incident angle, measured using frequency as a parameter.

A specimen having no layer structure is selected. Referring to FIG. 19 or 20, the specimen 13 is placed on the table 18a. An incident angle is selected, before the high frequency oscillator 9 is caused to apply a burst signal (an electric impulse signal) A to an ultrasonic transducer 10a. The ultrasonic transducer 10b converts the reflected ultrasonic wave to an electric signal B which is applied to the spectrum analyzer 16a, which outputs a resultant spectrum representing the relations between the intensity of an ultrasonic wave and the corresponding frequency of the ultrasonic wave. The foregoing measurement is repeated, step by step, after the incident angle is varied. After a variety of the foregoing spectrum is acquired, the relations between the intensity of an ultrasonic wave and the corresponding incident angle are acquired for an arbitrarily selected frequency, as is illustrated in FIG. 21. The incident angle $\theta_r$ at which the intensity of the ultrasonic wave becomes a minimum is read. The phase velocity $V_p$ of an elastic surface wave is calculated by the formula:

$$V_p = \frac{V}{\sin \theta_r}$$

wherein:
$V_p$ is the velocity of the ultrasonic wave in the ultrasonic transmission liquid, and
$\theta_r$ is the incident angle determined above.

B. Measurement of the Dispersion Curve of an Elastic Surface Wave

Figure 22:
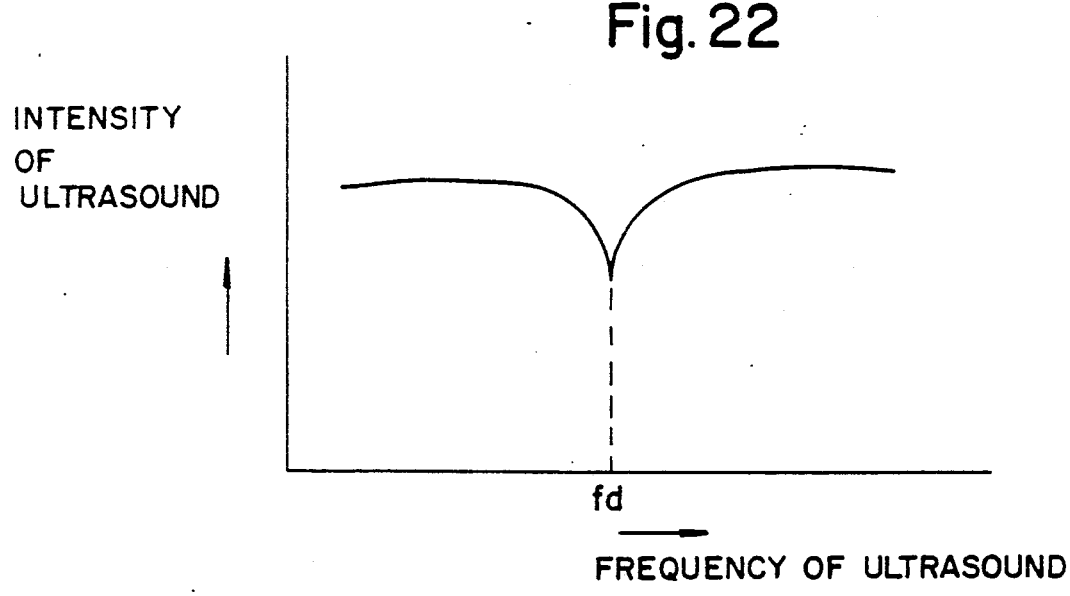
FIG. 22 is a graph illustrating the relations between the intensity of an ultrasonic wave and the corresponding dip frequency and illustrating the distribution of the intensity of an ultrasonic wave with respect to frequency, measured with respect to an incident angle as a parameter.
Figure 23:
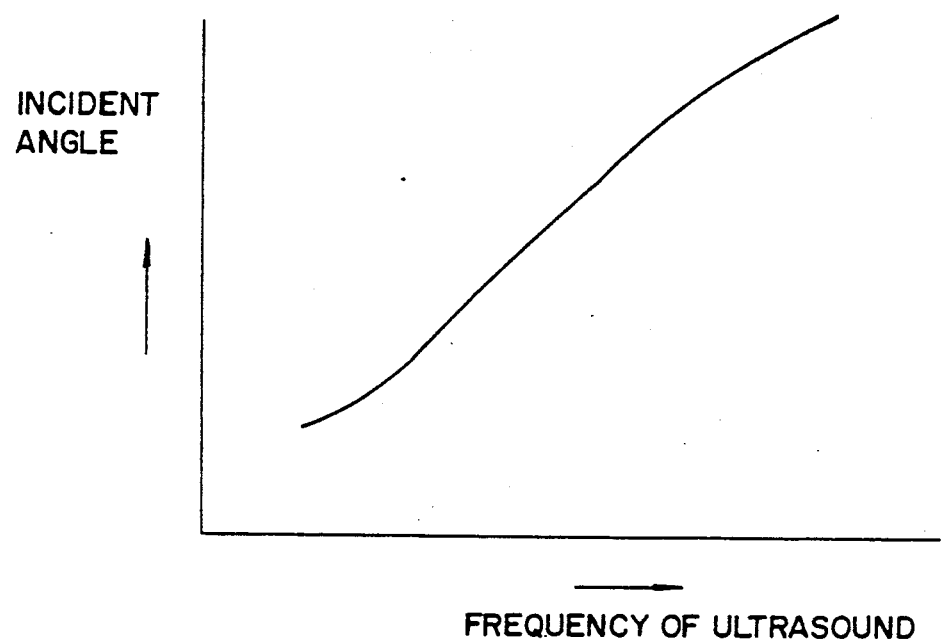
FIG. 23 is a dispersion curve illustrated in terms of the relations between the incident angle and the corresponding frequency of an ultrasonic wave.

A specimen having a layer structure is selected. Referring to FIG. 19 or 20, the specimen 13 is placed on the table 18a. An incident angle is selected, before the high frequency oscillator 9 is caused to apply a burst signal (an electric impulse signal) A to an ultrasonic transducer 10a. The ultrasonic transducer 10b converts the reflected ultrasonic wave to an electric signal B which is applied to the spectrum analyzer 16a, which outputs a resultant spectrum representing the relations between the intensity of an ultrasonic wave and the corresponding dip frequency $f_d$, as is illustrated in FIG. 22. The foregoing measurement is repeated, step by step, after the incident angle is varied. After a variety of the foregoing spectrum is acquired, the dispersion curve of an elastic surface wave defined as the relations between the incident angle and the corresponding dip frequency $f_d$ is acquired. An example of the dispersion curve of an elastic surface wave is illustrated in FIG. 23.

If required, the formula $$V = \frac{V}{\sin \theta}$$

wherein:
V is the velocity of the ultrasonic wave in the ultrasonic transmission liquid, and
$\theta$ is an incident angle
can be employed for converting incident angles to velocities.

C. Measurement of the Thickness of a Layer Constituting a Layer Structure

Figure 5:
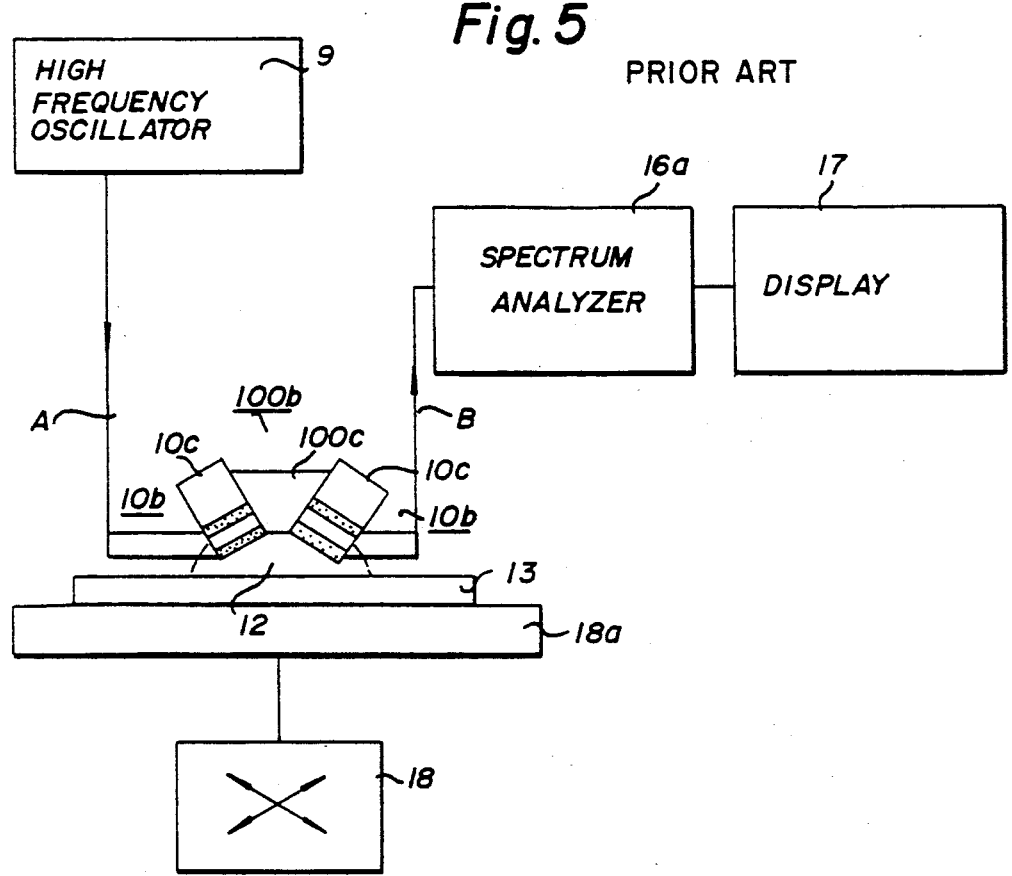
FIG. 5 is a schematic drawing of an ultrasonic acoustic microscope having an ultrasonic transducer assembly consisting of ultrasonic transducers each of which has a flat shaped ultrasonic wave emitting surface available in the prior art.
Figure 6:
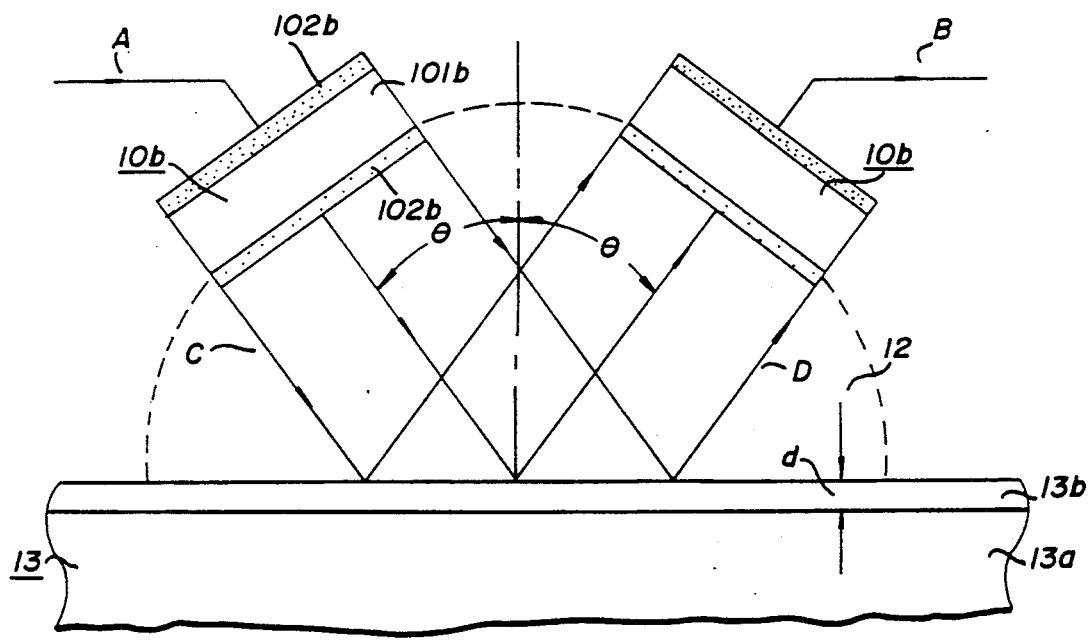
FIG. 6 is a schematic drawing explaining the function of an ultrasonic transducer having a flat shaped ultrasonic wave emitting surface available in the prior art.

A specimen having a layer structure or a piled body is selected. Referring to FIG. 19 or 20, the specimen 13 is placed on the table 18a. An incident angle is selected to be the optimum angle $\theta_1$ referred to in the description presented referring to FIGS. 5, 6 and 7, before the high frequency oscillator 9 is caused to apply a burst signal (an electric impulse signal) A to an ultrasonic transducer 10a. The ultrasonic transducer 10b converts the reflected ultrasonic wave to an electric signal B which is applied to the spectrum analyzer 16a, which outputs a resultant spectrum representing the relations between the intensity of an ultrasonic wave and the corresponding dip frequency $f_1$. The spectrum is similar to that which is illustrated in FIG. 7.

For calculating the thickness of the layer, the following formula is employed:

$$d = C/f_1$$

wherein:
$f_1$ is a dip frequency,
d is the thickness of a layer, and
C is a constant determined depending on the physical characteristics of the materials including the substrate, the layer and an ultrasonic transmission liquid and depending on the dip angle $\theta_1$.

The foregoing description has clarified that this invention successfully provides a plurality of improvements applicable to an ultrasonic transducer assembly and to an ultrasonic acoustic microscope, for the purpose of increasing the accuracy thereof, to provide a resolving power thereto, and to provide versatility for handling thereof, resulting in simplifying the procedure for the employment thereof.

Although this invention has been described with reference to specific embodiments, this should not be construed in a limiting sense. Various other embodiments and/or modifications of this invention will become apparent to persons skilled in the art upon reference to the description of this invention. It is therefore contemplated that the claims will cover any such embodiments and/or modifications as fall within the true scope of this invention.

What is claimed is:
1. An ultrasonic transducer assembly comprising:

a first ultrasonic transducer comprising a curved plate piezoelectric body sandwiched between two curved electrodes, wherein one of said curved electrodes has a concave surface facing a specimen and positioned such that ultrasonic waves emitted from said first ultrasonic transducer or reflected toward said first ultrasonic transducer converge toward a point on the surface of said specimen;

a second ultrasonic transducer comprising a flat plate piezoelectric body sandwiched between two planar electrodes, wherein one of said planar electrodes has a planar surface facing said specimen;

a holder means for supporting said first and second ultrasonic transducers above said specimen such that a normal line extending through the center of said planar surface and a normal line extending through the center of said concave surface intersect each other at a fixed angle on the surface of said specimen; and means for filting said holder means to vary an angle of incidence of said normal lines with said surface of said specimen while maintaining said fixed angle.

2. An ultrasonic transducer assembly according to claim 1, wherein said concave surface is spherically concave.

3. An ultrasonic transducer assembly according to claim 1, wherein said concave surface is cylindrically concave.

4. An ultrasonic transducer assembly according to claim 1, wherein said first ultrasonic transducer comprises means for generating an ultrasonic wave toward said specimen, and wherein said second ultrasonic transducer comprises means for receiving an ultrasonic wave reflected from said specimen.

5. An ultrasonic transducer assembly according to claim 1, wherein said second ultrasonic transducer comprises means for generating an ultrasonic wave toward said specimen, and wherein said first ultrasonic transducer comprises means for receiving an ultrasonic wave reflected from said specimen.

6. An ultrasonic transducer assembly according to claim 1, wherein said first and second ultrasonic transducers are mounted on respective support blocks, said support blocks being disposed in said holder means.

7. An ultrasonic transducer assembly comprising:

a first ultrasonic lens comprising a first ultrasonic transducer having a flat plate piezoelectric body sandwiched between two electrodes and a delay element attached to said first ultrasonic transducer, wherein said delay element has a concave surface facing a specimen and positioned such that ultrasonic waves emitted from said first ultrasonic lens or reflected toward said first ultrasonic lens coverage toward a point on the surface of said specimen;

a second ultrasonic lens comprising a second ultrasonic transducer having a flat plate piezoelectric body sandwiched between two electrodes and a delay element attached to said second ultrasonic transducer, wherein said delay element has a planar surface facing said specimen;

a holder means for supporting said first and second ultrasonic lenses above said specimen such that a normal line extending through the center of said planar surface and a normal line extending through the center of said concave surface intersect each other at a fixed angle on the surface of said specimen; and means for tilting said holder means to vary an angle of incidence of said normal lines with said surface of said specimen while maintaining said fixed angle.

8. An ultrasonic transducer assembly according to claim 7, wherein said concave surface is spherically concave.

9. An ultrasonic transducer assembly according to claim 7, wherein said concave surface is cylindrically concave.

10. An ultrasonic transducer assembly according to claim 7, wherein said first ultrasonic lens comprises means for generating an ultrasonic wave toward said specimen, and wherein said second ultrasonic lens comprises means for receiving an ultrasonic wave reflected from said specimen.

11. An ultrasonic transducer assembly according to claim 7, wherein said second ultrasonic lens comprises means for generating an ultrasonic wave toward said specimen, and wherein said first ultrasonic lens comprises means for receiving an ultrasonic wave reflected from said specimen.

12. An ultrasonic acoustic microscope comprising:
a high frequency oscillator;
an ultrasonic transducer assembly comprising a first ultrasonic transducer comprising a curved plate piezoelectric body sandwiched between two curved electrodes, wherein one of said curved electrodes has a concave surface facing a specimen and positioned such that ultrasonic waves emitted from said first ultrasonic transducer converge toward a point on the surface of said specimen;

a second ultrasonic transducer comprising a flat plate piezoelectric body sandwiched between two planar electrodes, wherein one of said planar electrodes has a planar surface facing said specimen;

a holder means for supporting said first and second ultrasonic transducers above said specimen such that a normal line extending through the center of said planar surface and a normal line extending through the center of said concave surface intersect each other at a fixed angle on the surface of said specimen; and means for tilting said holder means to vary an angle of incidence of said normal lines with said surface of said specimen while maintaining said fixed angle;

an X-Y table means comprising a X-Y movable table on which said specimen is placed;

a spectrum analyzer means receiving signals from at least one of said ultrasonic transducers; and a display means receiving signals from said spectrum analyzer means.

13. An ultrasonic acoustic microscope according to claim 12, wherein said concave surface is spherically concave.

14. An ultrasonic acoustic microscope according to claim 12, wherein said concave surface is cylindrically concave.

15. An ultrasonic acoustic microscope according to claim 12, wherein said first ultrasonic transducer comprises means for generating an ultrasonic wave toward said specimen, and wherein said second ultrasonic transducer comprises means for receiving an ultrasonic wave reflected from said specimen.

16. An ultrasonic transducer assembly according to claim 12, wherein said second ultrasonic transducer comprises means for generating an ultrasonic wave toward said specimen, and wherein said first ultrasonic transducer comprises means for receiving an ultrasonic wave reflected from said specimen.

17. An ultrasonic acoustic microscope comprising:
a high frequency oscillator;
an ultrasonic transducer assembly comprising
  a first ultrasonic lens comprising a first ultrasonic transducer having a flat plate piezoelectric body sandwiched between two electrodes and a delay element attached to said first ultrasonic transducer, wherein said delay element has a concave surface facing a specimen and positioned such that ultrasonic waves emitted from said first ultrasonic lens or reflected toward said first ultrasonic lens converge toward a point on the surface of said specimen;
  a second ultrasonic lens comprising a second ultrasonic transducer having a flat plate piezoelectric body sandwiched between two electrodes and a delay element attached to said second ultrasonic transducer, wherein said delay element has a planar surface facing said specimen;
  a holder means for supporting said first and second ultrasonic means above said specimen such that a normal line extending through the center of said planar surface and a normal line extending through the center of said concave surface intersect each other at a fixed angle on the surface of said specimen; and
  means for tilting said holder means to vary an angle of incidence of said normal lines with said surface of said specimen while maintaining said fixed angle;
an X-Y table means comprising X-Y movable table on which said specimen is placed;
a spectrum analyzer means receiving signals from at least one of said ultrasonic lenses; and
a display means receiving signals from said spectrum analyzer means.

18. An ultrasonic acoustic microscope according to claim 17, wherein said concave surface is spherically concave.

19. An ultrasonic acoustic microscope according to claim 17, wherein said concave surface is cylindrically concave.

20. An ultrasonic acoustic microscope according to claim 17, wherein said first ultrasonic lens comprises means for generating an ultrasonic wave toward said specimen, and wherein said second ultrasonic lens comprises means for receiving an ultrasonic wave reflected from said specimen.

21. An ultrasonic transducer assembly according to claim 17, wherein said second ultrasonic lens comprises means for generating an ultrasonic wave toward said specimen, and wherein said first ultrasonic lens comprises means for receiving an ultrasonic wave reflected from said specimen.

* * * * *